(12) United States Patent
Kossor

(10) Patent No.: US 8,662,058 B2
(45) Date of Patent: Mar. 4, 2014

(54) METHOD AND APPARATUS FOR PROVIDING ELECTRONIC IGNITION OF EARLY AUTOMOBILE ENGINES

(76) Inventor: Michael Gordon Kossor, Kenilworth, NJ (US)

( * ) Notice: Subject to any disclaimer, the term of this patent is extended or adjusted under 35 U.S.C. 154(b) by 1119 days.

(21) Appl. No.: 12/626,921

(22) Filed: Nov. 29, 2009

(65) Prior Publication Data
US 2011/0126802 A1 Jun. 2, 2011

(51) Int. Cl.
*F02P 3/04* (2006.01)

(52) U.S. Cl.
USPC .......... 123/595; 123/635; 123/647; 123/153; 361/263

(58) Field of Classification Search
USPC ............... 123/595, 647, 650, 635, 153, 154; 361/247, 253, 263
See application file for complete search history.

(56) References Cited

U.S. PATENT DOCUMENTS

| | | | | |
|---|---|---|---|---|
| 4,064,858 A * | 12/1977 | Forde | ............................ | 123/640 |
| 4,304,212 A * | 12/1981 | Rivoal et al. | .................. | 123/613 |
| 4,414,949 A * | 11/1983 | Honig et al. | ............. | 123/406.13 |
| 5,139,003 A * | 8/1992 | Ohhashi et al. | ................ | 123/635 |
| 7,681,562 B2 * | 3/2010 | Boerjes | ........................... | 123/622 |
| 2005/0039731 A1 * | 2/2005 | Bittner | .......................... | 123/595 |

* cited by examiner

*Primary Examiner* — Willis R Wolfe, Jr.
*Assistant Examiner* — Anthony L Bacon

(57) ABSTRACT

An electronic ignition module for vintage automobiles that utilizes existing components and wiring to retain the look and operation of the original system but with superior performance. The ignition module replaces the original roller and contacts of a vintage automobile ignition timer with modern control electronics that actuate the original coils and original spark plugs using the original wiring in the original manor. Electronic ignition operation is user programmable to emulate the original roller/timer performance or provide automatic spark advance similar to modern automobile operation for optimum power and efficiency while freeing the operator from manual adjustment of spark timing. Ignition module programming is accomplished without any external switches, buttons, jumpers or modification to the vintage automobile by simply sensing the presence or absence of ignition coils connected to the system when power is applied. The electronic ignition module resides fully contained within the confines of the original timer housing without any modifications what so ever, rendering it completely undetectable by visual inspection.

6 Claims, 6 Drawing Sheets ically located within coil box 6 and to power electronic sensors located on circuit board 21 physi-

METHOD AND APPARATUS FOR PROVIDING ELECTRONIC IGNITION OF EARLY AUTOMOBILE ENGINES

BACKGROUND

1. Field of the Invention

This invention relates to automobile ignition systems. More specifically, this invention relates to early automobile electronic ignition systems.

2. Prior Art

Figure 1:
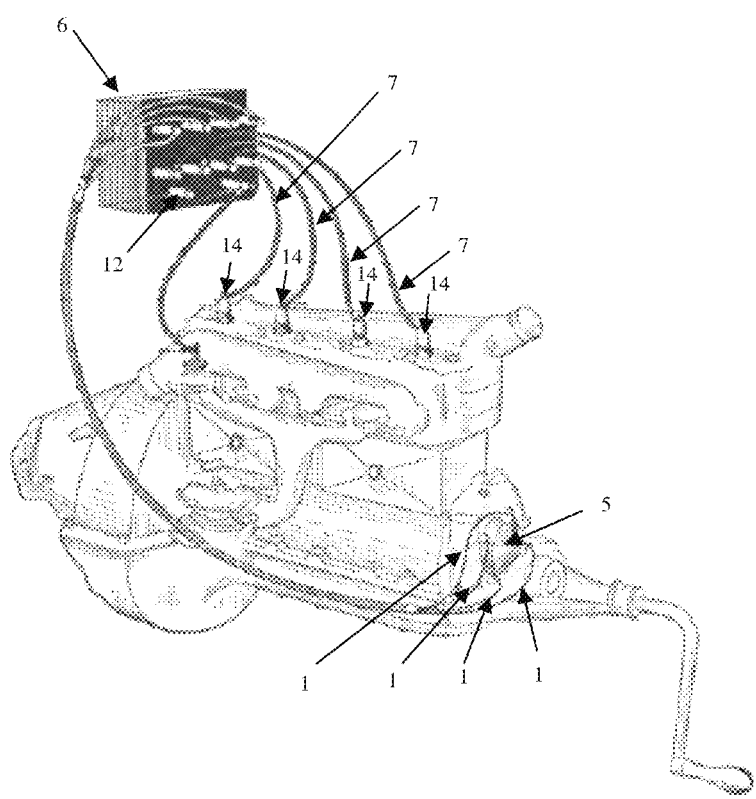

FIG. 1 depicts an example of an early automobile ignition system. An example of an automobile that used such a system was the Ford Model T. For the purposes of discussion that follows, the term early refers to automobiles produced between the years of 1900 and 1930. The main components of the system comprise commutator 5, coil primary wires 1, coil box 6 containing ignition coils, spark plug wires 7 used to carry high voltage spark to their corresponding spark plugs 14. Note that commutator 5 is sometimes referred to as a Timer.

Figure 2:
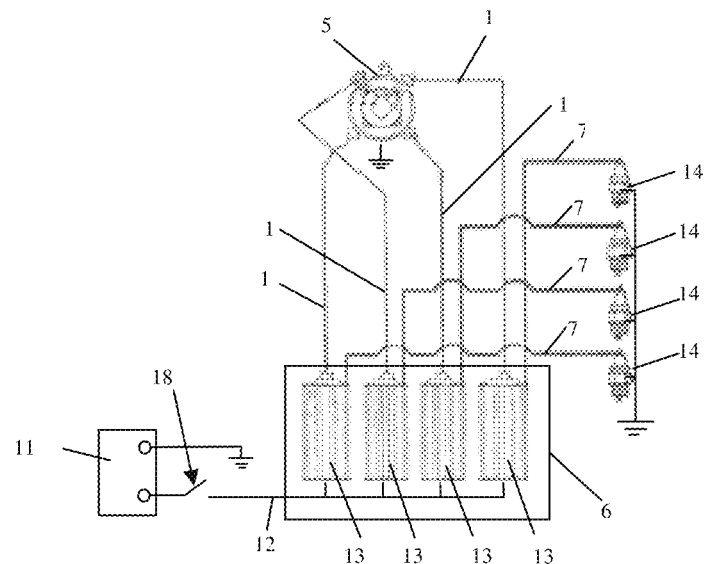

The basis of operation of this system is 100 year old technology and is well known to those skilled in the art. A brief summary of the essential elements as they pertain to the subject of the present invention will be covered. A simplified schematic diagram for the early ignition system is illustrated in FIG. 2. Ignition switch 18 is closed to provide power from battery 11 to each of the coils 13 contained within coil box 6. Actuation of each coil 13 is controlled by commutator 5 which is physically connected to and operated by the automobile engine CAM shaft that rotates when the engine is cranked. Ignition coils 13 are actuated sequentially by commutator 5 grounding their respective primary windings via wires 1 to engine ground which is typically connected to the negative terminal of battery 11. Coil actuation results in a self oscillation of primary current resulting in the generation of high voltage pulses on their corresponding secondary winding output. The high voltage pulses from the ignition coil secondary are carried to the respective engine spark plugs 14 via wires 7. The spark timing must be manually altered by the user as engine speed changes for optimum engine operation. This is accomplished by mechanically rotating commutator 5 with respect to its mounting position on the engine which effectively changes its relationship to the engine CAM shaft position and hence advances or retards the ignition timing.

Figure 3:
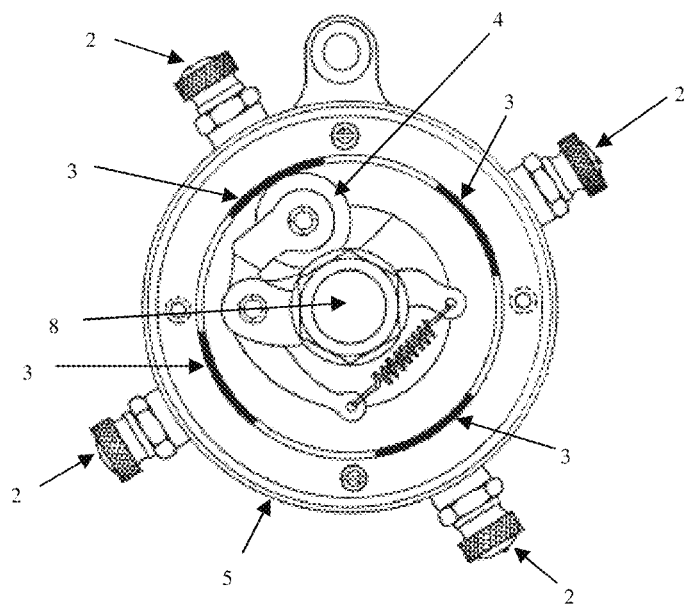

FIG. 3 illustrates details of commutator 5. The coil primary wires of ignition coils are connected to commutator terminals 2. Each terminal is connected to a corresponding independent electrical contact 3 within the commutator housing. Roller 4 comprises a metal wheel physically and electrically connected to engine CAM shaft 8 that rotates when the engine CAM shaft rotates. Roller 4 functions to provide electrical connection between terminals 3 and the CAM shaft which is also connected to engine ground, most often the negative terminal of the battery 11 of FIG. 2. Ignition coil wires 1 connected to commutator terminals 2 are thus electrically connected to engine ground sequentially as roller 4 rotates, connecting their respective electrical contact 3 to the CAM shaft ground which is also engine ground. Ignition coil actuation occurs when its respective terminal on commutator 5 is grounded by roller 4 as described previously.

Figure 4:
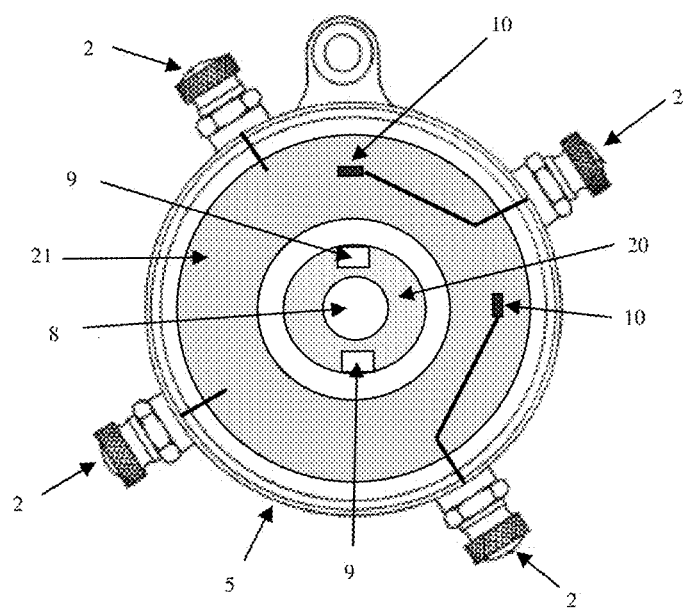

FIG. 4 illustrates an example of prior art that attempts to improve upon the original ignition system of FIG. 2 by eliminating reliance on physical mechanical contact between roller 4 and electrical contacts 3 of FIG. 3 in order to actuate associated ignition coils 13. This is accomplished by replacing the mechanical electrical contacts 3 of FIG. 3 with circuit board 21 containing modern electronic sensors 10 and replacing roller 4 of FIG. 3 with rotor 20 that is still physically attached to engine CAM shaft 8. Rotor 20 contains one or more sensor actuators 9 employed to actuate sensors 10 as they are rotated by the CAM shaft. CAM shaft position sensing is not new or novel. The sensors and sensor actuators may take the form of optical or magnetic or vein. CAM shaft position sensing and operation are well known to those skilled in the art. Electrical contact terminals 2 are no longer used to actuate ignition coils 13. Select commutator terminals 2 are now used to signal CAM shaft position when sensors 10 are responsive to CAM shaft sensor activators 9. Another commutator terminal 2 function is changed to supply an independent source of external DC power to sensors 10 and the remaining commutator terminal 2 is changed to provide connection to engine ground as a DC power return. Hence, the purpose, wiring and operation of commutator 5 is completely different from the original vintage ignition system. A distinct disadvantage of the prior art of FIG. 4 on a vintage automobile is the need to completely change and re-wire the purpose of each original wire thus destroying the originality of the vintage automobile. Another disadvantage is the use of multiple CAM sensors 10 and multiple CAM sensor activators 9 unless there is a means of compensating differences in sensor to sensor activation times which translates directly to variation in ignition timing which is contrary to the entire purpose of the apparatus.

Figure 5:
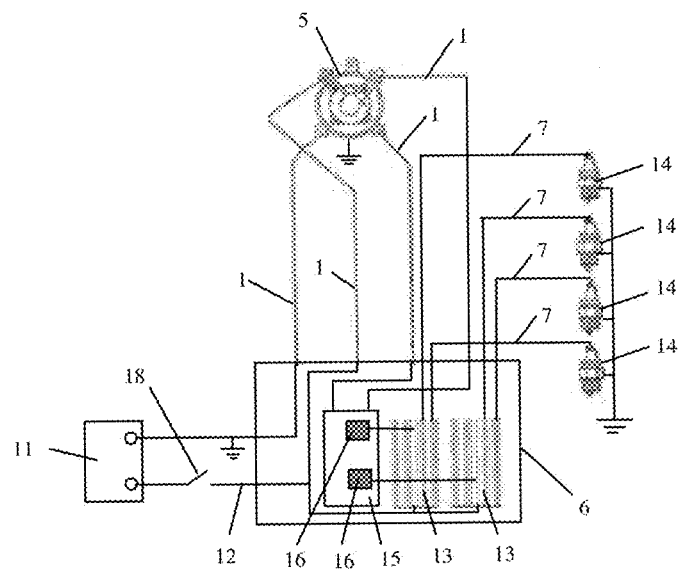

Operation of the prior art electronic ignition system of FIG. 4 is facilitated with the aid of FIG. 5. Commutator 5 no longer actuates ignition coils 13 directly by providing a path to engine ground, rather, it now functions solely to signal the position of the engine CAM shaft via two of the former coil primary wires 1. The function of another former coil primary wire 1 is changed to supply a source of dedicated external DC power to the CAM shaft sensors resident on circuit board 21 located within commutator 5. The function of remaining former coil primary wire 1 is changed to provide a connection to engine ground. Referring to FIG. 5, operation is as follows: Ignition switch 18 is closed to provide a source of uninterrupted power from battery 11 via battery wire 12 to electronic control module 15 physically located within coil box 6 and to power electronic sensors located on circuit board 21 physically located within commutator 5 that were previously described with the aid of FIG. 4. Commutator 5 now solely functions to monitor the position of the engine CAM shaft and sends trigger signals via select commutator wires 1 to electronic control module 15 physically located in coil box 6. Electronic control module 15 processes the trigger signals from commutator 5 and turns on semiconductor switches 16 which in turn actuate the firing of coils 13 in synchronization with engine operation. One will note another significant difference in the configuration of FIG. 5 compared to the original prior art of FIG. 2 in that the prior art of FIG. 5 only employs two ignition coils 13 rather than the original four. Engine operation is still possible by exploiting the four stroke cycle of the internal combustion engine; intake, compression, power and exhaust of the four cylinder engine and firing two cylinders in tandem rather than one. The power stroke is fired as usual, however, the other cylinder in the pair is at the end of the exhaust stroke at the time the pair fire which simply does not contribute to the production of engine power. For this reason, this method of engine ignition is well known as the "wasted spark" method to those skilled in the art.

The prior art of FIG. 5 has another disadvantage which are avoided by the present invention. A notable disadvantage of the prior art is the need to eliminate two of the ignition coils and use of the "wasted spark" method. The wasted spark method is functional but is not benign to engine operation especially during engine starting. The wasted spark firing in the cylinder on its exhaust stroke may in fact fire when at the beginning of the next intake cycle depending upon engine timing. Air and fuel may have already begun to enter cylinder if engine timing is retarded causing a puff back or back fire into the carburetor making it difficult to start. This is of particular disadvantage on a early automobile which relies upon hand cranking to start which can become exhausting. The starting procedure of early hand cranked automobiles requires retarding ignition timing to avoid personal injury from engine kick back which helps guarantee air/fuel mixture has already begun to enter the non-firing cylinder when the "wasted" spark occurs in that cylinder. Another disadvantage of the prior art of FIG. 5 is the need to significantly alter the components of the original system. Coil box 6 of FIG. 5 must be either completely rewired or a pre re-wired module must be installed in place of the original coils 13 to implement the wiring and component swaps. This is undesirable on vintage automobiles which are prized for their original appearance and function. Coil box 6 is often easily accessible and inspected to reveal significant modifications have been made to the automobile and it is non-original. Furthermore, substitution of original coils 13 may be necessary to fit all components into coil box 6 result in coil operation that does not mimic original coil operation in which a characteristic "buzz" of the coil primary associated points is heard further diminishing originality.

BRIEF SUMMARY OF THE PRESENT INVENTION

Collection and operation of early automobiles is a popular pursuit that depends upon components that ware with use such as the coil points, roller and commutator of the ignition system. Replacement components are becoming increasingly more difficult to find, can be expensive and often are time consuming to replace and align; requiring expensive special tools and the knowledge of how to properly use them. Parts reproductions are often easily identifiable or alter the performance of the original ignition system degrading the antique value or costing points awarded for originality during automobile shows.

It is the objective of the present invention to offer a solution to this problem by providing a maintenance free, programmable electronic ignition module for early automobiles that utilizes all the existing components and wiring to retain the appearance and operation of the original system but with superior performance. The invention replaces the original roller/commutator contacts of the original vintage system and actuates the original coils that fire the original spark plugs using the original wiring in a similar manor. Electronic ignition module operation is user programmable to emulate the original roller/commutator performance or provide automatic spark advance similar to modern automobile operation for optimum power and efficiency while freeing the operator of the burden of manual adjustment of spark timing. Ignition module programming is accomplished without any external switches, jumpers or modification to the vintage automobile by simply sensing the presence or absence of ignition coils when power is applied. The electronic ignition module resides fully contained within the confines of the original timer housing without any modifications what so ever, rendering it completely undetectable by visual inspection.

SHORT DESCRIPTION OF THE DRAWINGS

The present invention will become more fully understood from the detailed description given herein below and the accompanying drawings which are given by way of illustration only, where in like reference numerals designate corresponding parts in the various drawings, and within:

FIG. 1: Illustrates the fundamental components of the early automobile ignition system.

FIG. 2: Illustrates interconnectivity of the prior art and facilitates the description of its operation.

FIG. 3: Illustrates the inner workings of commutator 5 of FIG. 2 and is used to facilitate the description of its operation.

FIG. 4: Illustrates another example of prior art that provides a means of electronic actuation rather than physical mechanical actuation.

FIG. 5: Illustrates how prior art of FIG. 4 is integrated within in the original system of prior art of FIG. 2.

Figure 6:
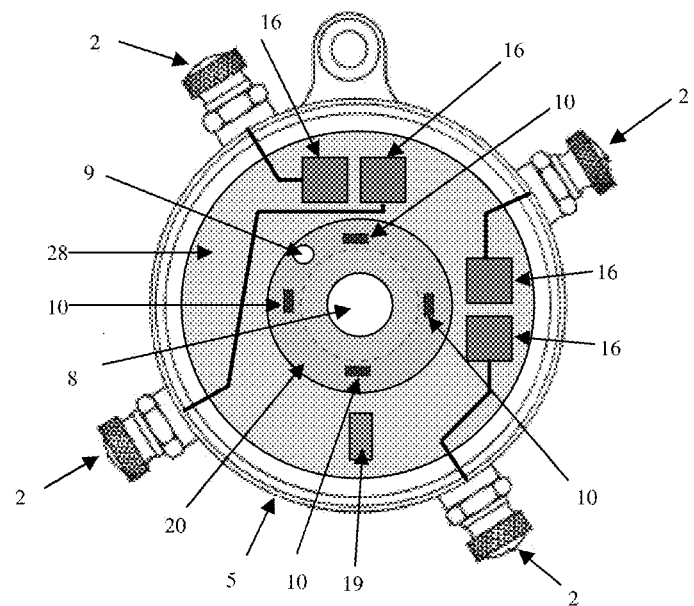

FIG. 6: Illustrates one embodiment of the present invention that utilizes four sensors and one sensor actuator.

Figure 7:
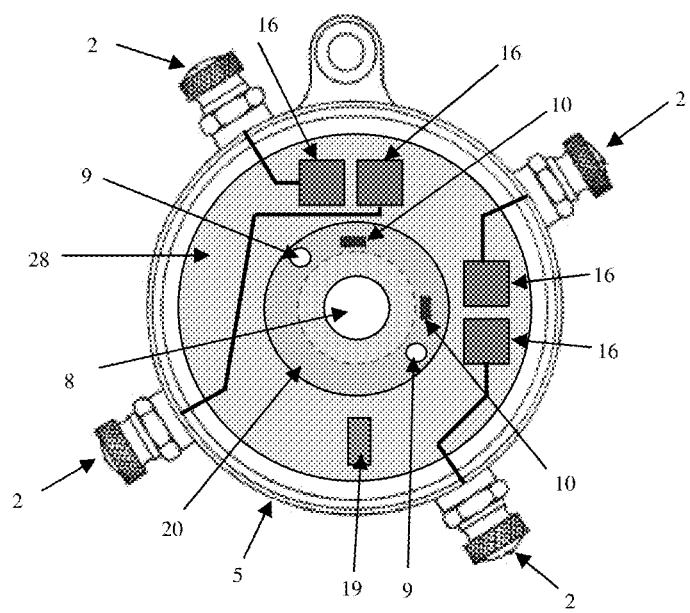

FIG. 7: Illustrates another embodiment of the present invention that utilizes two sensors and two sensor actuators FIG. 8: Illustrates a detailed schematic diagram of the present invention FIG. 9: is a detailed schematic diagram showing a modified form of the present invention useful in automobiles that operate on a wider battery voltage range.

DETAILED DESCRIPTION OF THE INVENTION

Referring to FIG. 6, which shows one embodiment of the present invention, commutator housing 5 employs electrical terminals 2 that are normally isolated from commutator housing 5. Ignition module 28 is physically mounted within housing 5. Electronic sensors 10 located on ignition module 28 are actuated by sensor activator 9 located on rotor 20 that is physically mounted to engine CAM shaft 8. Operation is as follows: Rotor 20 rotates with engine CAM shaft 8. Sensor activator 9 functions to activate a particular sensor 10 when it moves within close proximity to it. Microcontroller 19 located on ignition module 28 detects actuation of the particular sensor 10 and functions activate a corresponding electronic switch 16 that electrically connects its corresponding terminal 2 to commutator housing 5 which is also normally electrically connected to engine ground. Microcontroller 19 determines the mapping between sensor 10 activation and which electronic switch 16 is activated. The present invention just described contained within commutator 5 is a drop in replacement for the prior art commutator 5 of FIG. 2 where coil actuation with respect to CAM shaft position is identical to that described for FIG. 2 with the exception that electronic switching is used as opposed to mechanical switching to activate the ignition coils connected to terminals 2. The coil points on coils 13 are typically electrically shorted so as to bypass their ability to independently open and fire spark at the inappropriate time.

The burden of actuating the ignition coils to produce a continuous series of high voltage sparks when actuated in response to proper alignment of CAM shaft sensor 10 and sensor activator 9 now falls on the electronic ignition module 28 instead of the ignition coils 13. This is yet another benefit of the present invention as the ignition coils 13 require careful skilled adjustment and ware out with usage. An internal component of coils 13 commonly fails in a short circuit rendering the ignition coils useless in the original system. An ignition coil with this shorted internal component is still usable in the electronic ignition system described in the present invention since the ignition coil points in which this component is connected are typically shorted (electrically connected) anyway. It should also be noted that the electronic ignition module 28 has the ability to adjust the duration and duty cycle of the pulses generated by the electronic ignition module to optimize the efficiency and performance of respective ignition coil 13 operation by microcontroller 19 measuring the voltage applied to the system and applying the appropriate value for ignition coil on (charge) time and off (discharge) time and firing frequency.

It should be understood that the order of activation of electronic switches 16 as rotor 20 turns as well as the mapping of a particular electronic switch 16 to a particular terminal 2 may be changed to any order to facilitate optimal engine operation. It should also be understood that only two CAM sensors 10 may be employed located 90 degrees with respect to one another with the addition of a second sensor actuator 9 on rotor 20 located 180 degrees in opposition in position as illustrated in the embodiment of the present invention of FIG. 7.

In either embodiment of FIG. 6 or 7, the locations of the sensors on ignition module 28 and location of sensor actuators on rotor 20 are orientated to CAM shaft 8 to synchronize rotation and operation with the associated engine to which the CAM shaft is attached.

Note that both embodiments of the present invention illustrated in FIGS. 6 and 7 employ multiple CAM sensors 10 and CAM sensor activators 9 as had some prior art, however, the present invention utilizes microcontroller 19 that is responsive to CAM sensor 10 activation and has the capability of utilizing internally stored sensor calibration information to equalize differences in sensor to sensor activation delay to prevent differences between sensors from translating to variations in ignition timing thereby maintaining precision ignition timing.

Figure 8:
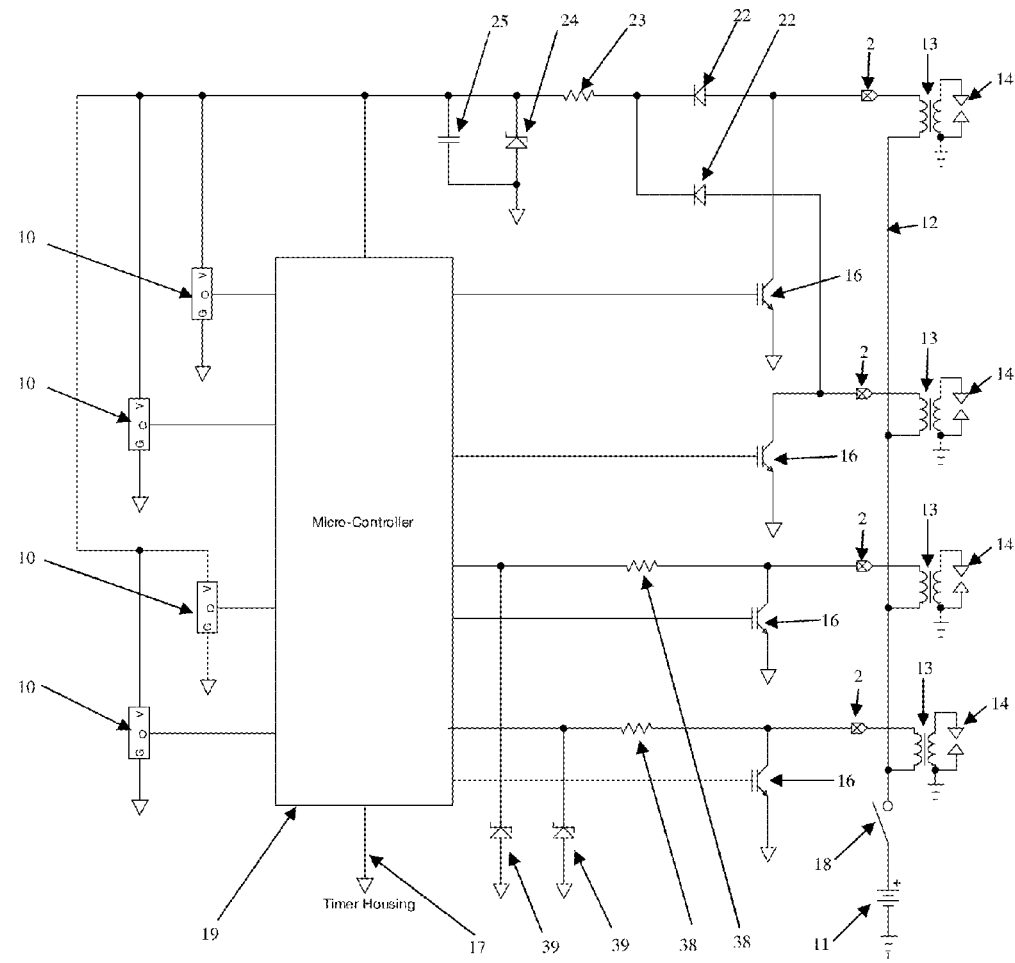

FIG. 8 shows a detailed schematic diagram for one embodiment of the present invention. Microcontroller 19 monitors inputs connected to sensors 10 responsible for detecting the position of engine CAM shaft 8 of FIGS. 6 and 7. Microcontroller 19 is also responsible for actuating electronic switches 16 in the proper sequence for a particular duration. Electronic switches 16 are electrically connected between their respective commutator terminal 2 and commutator ground 17 which is electrically connected to commutator housing 5 of FIGS. 6 and 7.

A unique and novel aspect of the present invention is the method in which it is powered. Commutator terminals 2 are each connected to the positive terminal of battery 11 via their associated ignition coil 13 primary winding, wire 12 and ignition switch 18. Although each coil 13 primary winding is periodically switched to commutator ground 17 via corresponding electronic switch 16 to actuate corresponding spark plug 14, they are never all simultaneously switched to ground at the same instance of time. In this way, power from battery 11 is always available from at least one other of commutator terminals 2. The circuit is also designed to be immune to the resulting high voltage transients produced by actuating associated ignition coils 13 in the generation of spark and capable of passing the resulting high voltage return spark current safely to engine ground via commutator ground without impact or damage to ignition module 28.

Powering the electronic ignition circuitry in this way preserves the original automobile wiring, interconnectivity and function without modification, by completely eliminating the need for an independent connection to uninterrupted power source as necessary with the prior art. Diodes 22 and resistor 23 prevent loading from commutator terminals 2 when a terminal is switched to ground to fire its corresponding ignition coil 13. Diodes 22 also provide a source of DC power from commutator terminals 2 when they are not being switched to ground for the purpose of actuating their associated ignition coils 13 to generate spark from their respective spark plug 14. Together, diodes 22 provide an uninterrupted source of DC power for circuit operation since more than one commutator terminal is never switched to ground simultaneously. Resistor 23 limits the current to Zener diode 24 which provides a source of regulated voltage to operate microcontroller 19 and all other electronic components. Zener diode 24 also protects the power supply from high positive voltage and negative voltage spikes generated by its associated ignition coil 13 activation. Capacitor 25 filters out any voltage variation caused when switching between voltage sources supplied from commutator terminals 2.

Another unique and novel aspect of the embodiment of FIG. 8 is the way microcontroller 19 can communicate and be programmed by the user using the same commutator terminals 2 used to actuate ignition coils 13, when commutator terminals 2 are not being used to actuate ignition coils 13, causing microcontroller 19 to function in different modes without the need for any external switches, buttons, jumpers or modification to the original automobile wiring preserving its originality. Programming is accomplished by sensing the presence or absence of ignition coils during power up, that is: closure of ignition switch 18. Commutator terminals 2 connected to their respective ignition coil 13 primary provide a source of power via battery wire 12 connected to the positive terminal of battery 11 via ignition switch 18. Microcontroller 19 can check if a coil is present or absent by checking the voltage level on its respective commutator terminal 2. In this way, microcontroller 19 can use the presence or absence of ignition coils during power up when terminals 2 are not being used to actuate ignition coils 13 to determine which program options are to be used when the program runs the next time the microcontroller is powered by storing the programming information in non-volatile memory to remember which programming option is to be programmed whenever it is powered again in the future with all ignition coils 13 installed as is normally the case.

Using this example involving the presence of absence of two coils, four programming scenarios are distinctly possible. Isolation resistors 38 prevent loading of terminals 2 when terminals 2 are used to actuate ignition coils 13 so as not to affect normal ignition coil actuation. Zener diodes 39 limit the voltages presented to microcontroller 19 to safe levels at all times including during the actuation of ignition coils 13.

Microcontroller 19 can execute a default program upon initial power up that mimics the original ignition system of the early automobile by actuating ignition coils 13 of FIG. 8 as long as sensor actuator 9 of FIG. 6 remains in close proximity of its corresponding sensor 10 of FIG. 6. Microcontroller 19 can also execute an alternative program that delays actuation of coils 13 when sensor actuator 9 of FIG. 6 remains in close proximity of its corresponding sensor 10 of FIG. 6. The delayed activation can be varied depending upon the CAM shaft rotational velocity to provide less delay as the revolutions per minute (RPM) increase effectively advancing the spark timing with engine speed as is well known and commonly done in modern automobile ignition systems.

Microcontroller 19 can also communicate with terminals 2 during engine operation, when terminals 2 are not being used to actuate coils 13 via isolation resistors 38, to acquire the present operating voltage applied to terminals 2. Microcontroller 19 can use this information of operating voltage to determine if changes are necessary to the way microcontroller 19 actuates ignition coils 13 to obtain optimal engine performance.

Figure 9:
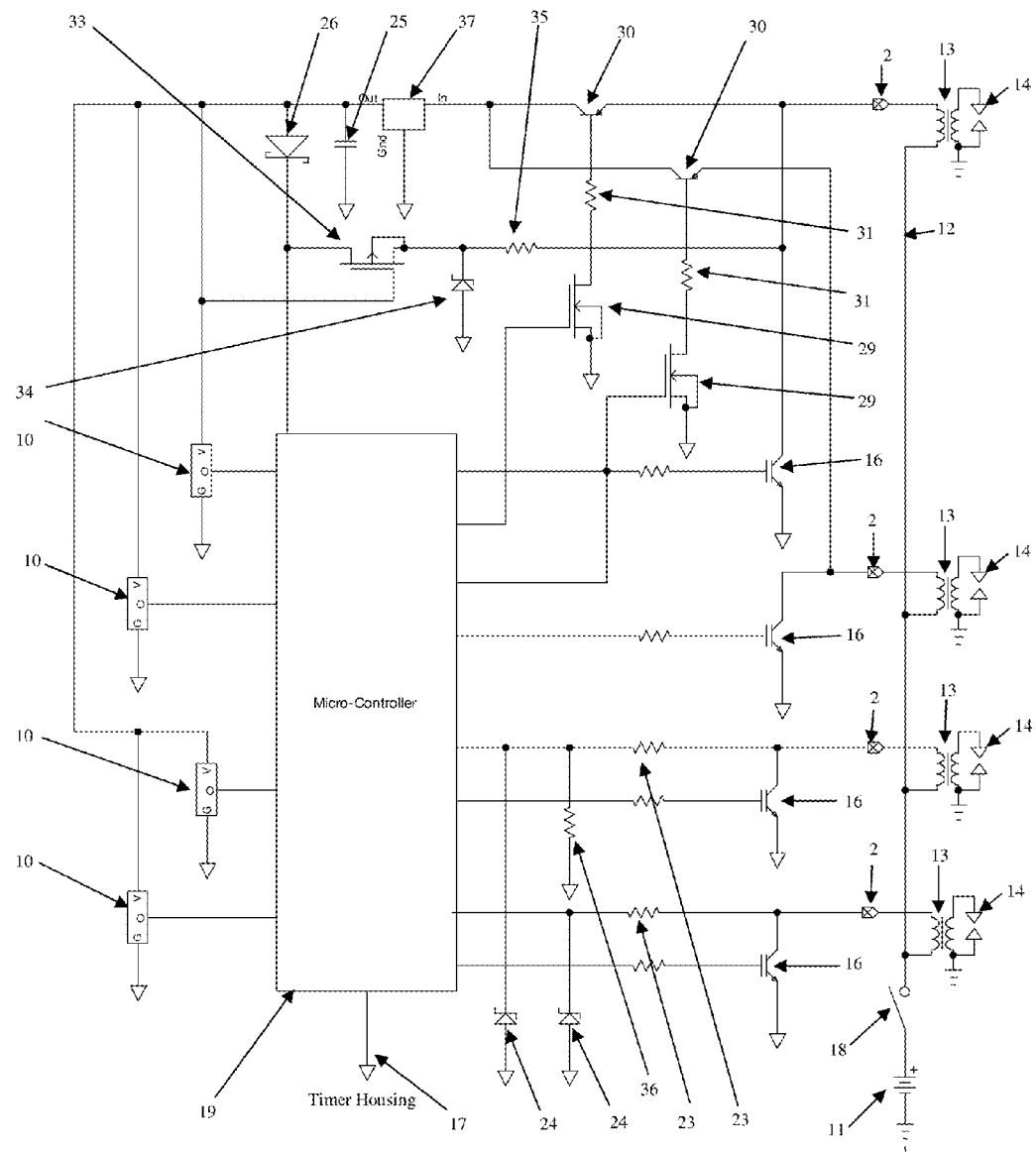

FIG. 9 shows a detailed schematic diagram for an alternate embodiment of the present invention useful in operating over a broad operating voltage range. Microcontroller 19 monitors inputs connected to sensors 10 responsible for detecting the position of engine CAM shaft 8 of FIG. 6 and FIG. 7. Microcontroller 19 is also responsible for actuating electronic switches 16 in the proper sequence for a particular duration to actuate corresponding ignition coil 13 and corresponding spark plug 14. Electronic switches 16 connect their respective commutator terminals 2 to commutator ground 17 which is electrically connected to commutator housing 5 of FIG. 6 and FIG. 7 as was described previously.

The way the circuit of FIG. 9 is powered is again unique and novel as it receives power exclusively from the same terminals used to actuate the primary windings of ignition coils 13 yet the circuit is designed to be immune to the resulting high voltage transients associated with actuating associated coil 13 in the generation of spark and the ability to safely pass the resulting high voltage spark current to commutator ground 17. Commutator terminals 2 are connected to the positive terminal of battery 11 via their associated ignition coil 13 primary winding via wire 12 and ignition switch 18. Although each coil 13 primary winding is periodically switched to commutator ground 17 via corresponding electronic switch 16, they are never all simultaneously switched to ground at the same instance of time. In this way, power from battery 11 is always available from another commutator terminal 2 and at times may be available from more than one commutator terminal 2. Microcontroller 19 of this embodiment of the invention controls from which commutator terminal 2 power is to be supplied since microcontroller 19 also controls which commutator terminals 2 are switched to ground via corresponding electronic switch 16 to actuate their associated ignition coil 13 to generate spark from its associated spark plug 14. Microcontroller 19 selects power from the terminal or terminals not being used to actuate its associated coil 13 by turning on its associated electronic switch 29 which in turn turns on its corresponding electronic switch 30 to provide power to voltage regulator 37 which then provides conditioned power to microcontroller 19 via schottky diode 26. Capacitor 25 filters out any voltage ripple present and associated resistor 31 limits the current flow through electronic switch 30 to a safe value. Microcontroller 19 functions to turn off the source of power from commutator terminal 2 which is switched to ground via its associated electronic switch 16 by turning off the terminals associated electronic switch 29 and its associated electronic switch 30 cutting off the supply of power from that particular coil terminal effectively isolating it from the input of voltage regulator 37 when it is activating its associated ignition coil 13. This operation functions to protect voltage regulator 37 from the high voltage transients resulting from the actuation of the terminal's associated coil 13 and prevents voltage regulator 37 from loading down the associated terminal being used to actuate its associated ignition coil 13 which would otherwise compromise the generation of sufficiently high voltage necessary to operate its associated spark plug 14.

An initial source of power must be provided to microcontroller 19 before it can take over managing control of its power source as just described. This is accomplished from a select commutator terminal 2 by resistor 35 and Zener diode 34 as was similarly done in the embodiment of FIG. 8 to provide a regulated source of power while the current draw requirement is low. Electronic switch 33 is added to automatically disconnect this temporary source of power once microcontroller takes over managing control of its power source when power becomes available at the output of voltage regulator 37 as was described previously. Schottky diode 26 isolates temporary power source provided by resistor 35, Zener diode 34 and electronic switch 33 from being loaded down from microcontroller operated voltage regulator 37 before it becomes operational. Electronic switches 30 are capable of withstanding high voltages that effectively isolate their associated commutator terminals 2 that are subjected to high voltage and negative spikes when they are used to actuate their respective ignition coil 13. Powering the electronic ignition circuitry in this way also preserves the original automobile wiring, interconnectivity and function without modification. The embodiment of FIG. 9 can also be programmed by the presence or absence of ignition coils 13 during power up; closure of ignition switch 18 as was described in detail for the embodiment of FIG. 8.

Another unique feature of the embodiment of FIG. 9 is the ability of microcontroller 19 to sense the value of battery voltage applied to the system via select commutator terminals 2 by the voltage divider formed by series resistor 27 and shunt resistor 36 utilizing the Analog to Digital Converter (ADC) input feature of microcontroller 19. This is a critical need if the battery voltage deviates from the nominal value, typically 12V. This is because the time needed to charge the associated ignition coils 13 changes as the battery voltage is varies. Early automobiles operated from battery voltages from 6 volts to 12 volts typically in 2 volt increments (6, 8, 10 or 12V). The software program operating microcontroller 19 utilizes knowledge of the supply voltage to select the proper coil charge time and discharge time for optimal ignition system performance without any input from the operator.

It should be understood that in either embodiment of the invention of FIG. 8 or FIG. 9, microcontroller 19 can be programmed to map actuation from camshaft sensors 10 to actuation of associated ignition coil 13 in different ways. One desirable way to map actuation is to commence of ignition coil 13 actuation as soon as the associated camshaft sensor 10 is activated and continue ignition coil 13 actuation until the associated camshaft sensor 10 ceases activation. This method of activation mimics the original operation of ignition system employed by early automobiles by the roller/contact. This example of mapping camshaft sensor activation to associated ignition coil actuation may be the default program executed by microcontroller 19 when power is applied and is not changed by the absence of any ignition coils 13 upon initial power up. Another desirable method to map actuation of camshaft sensors 10 to associated ignition coils 13 is to acknowledge activation of camshaft sensor 10 and delay actuation of its associated ignition coil 13 for a predefined interval that is dependant upon the frequency of activation of camshaft sensors 10 which is indicative of engine speed measured in Revolutions Per Minute (RPM). This method of mapping camshaft sensor 10 to associated ignition coil 13 can be used to advance ignition timing as engine RPM increases to obtain optimum engine power and efficiency. This automatic timing advancement method of mapping camshaft sensor 10 to associated ignition coil 13 may be the non-default, alternate, program executed by microprocessor 19 when one ignition coil 13 is removed from the circuit when power is first applied to signal a change in the default method of timing advancement.

What is claimed is:
1. An electronic ignition system for an internal combustion engine of an early automobile, the electronic ignition system comprising in combination:
a plurality of ignition coils, a source of electrical power, an electronic circuit board assembly fully imbedded within a commutator housing of a vintage automobile in place of original roller and mechanical electrical contacts; and electronic circuit board assembly further comprising at least two electrical contact terminals, each electrical contact terminal interposed in series circuit relation with the primary winding of an ignition coil to the source of electrical power to the internal combustion engine; and sensors responsive to the rotational position of a camshaft in the internal combustion engine, a first plurality of electronic switching circuits disposed in commutator housing, each electronic switching circuit actuated by said sensors closes then opens an electrical circuit including one said electrical contact terminal, commutator housing and internal combustion engine; and further comprising a second plurality of electronic switching circuits disposed in commutator housing, each electronic switching circuit actuated by said sensors opens then closes an electrical circuit including said electrical contact terminal, electronic circuit board assembly, commutator housing and internal combustion engine; and further comprising a plurality of resistive isolation means connected in series circuit relation with said electrical contact terminals, electronic circuit board assembly, commutator housing and internal combustion engine; and transient voltage suppression means connected at the junction of said resistive isolation means and electronic circuit board assembly in parallel circuit relation with commutator housing; and transient voltage suppression means connected in parallel circuit relation between said electrical contact terminals and commutator housing.

2. The electronic ignition system of claim 1, wherein;
sensors are actuated by optical, magnetic, inductive or capacitive means.

3. The electronic ignition system of claim of claim 1, wherein electronic switch actuation is controlled by discrete electronics or microprocessor/microcontroller operating under software control in response to activation of one or more said camshaft sensors which are responsive to rotational position of the camshaft; wherein
electronic switch activation can be immediately responsive to camshaft sensor activation or delayed appropriately for optimal engine ignition timing performance.

4. The electronic ignition system of claim 1, wherein said electrical contact terminals connected to the primary winding of said ignition coils are electronically conditioned to limit the voltage transients induced by ignition coil actuation to voltage levels capable of being processed by said circuit board assembly without damage and pass transient currents to commutator housing by means of at least one of the following devices; Zener diode, Transient Voltage Suppression Diode or Metal Oxide Varistor.

5. The electronic ignition system of claim 1, wherein;
first and second plurality of electronic switching means associated with said electronic contact terminal operates mutually exclusive to each other with respect to time.

6. The electronic ignition system of claim 1, wherein;
resistive isolation means and transient voltage suppression means permit communication of information between said electronic contact terminals and electronic circuit board assembly without disruption of ignition coil actuation by said electronic switching means connected in series circuit relation with said electrical contact terminals and commutator housing.

* * * * *